July 22, 1941.    J. J. JAKOSKY    2,250,024
METHOD OF DETERMINING UNDERGROUND STRUCTURES
Filed Dec. 1, 1937    2 Sheets-Sheet 1
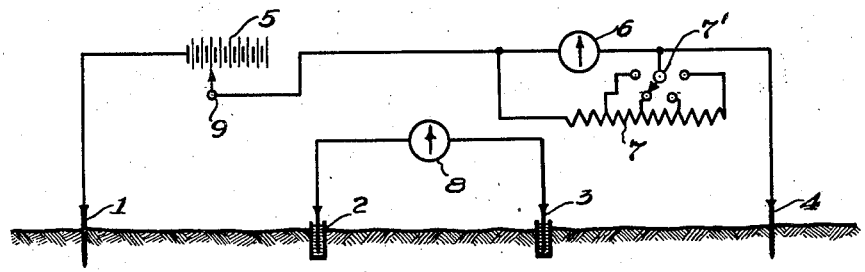
Fig.1.
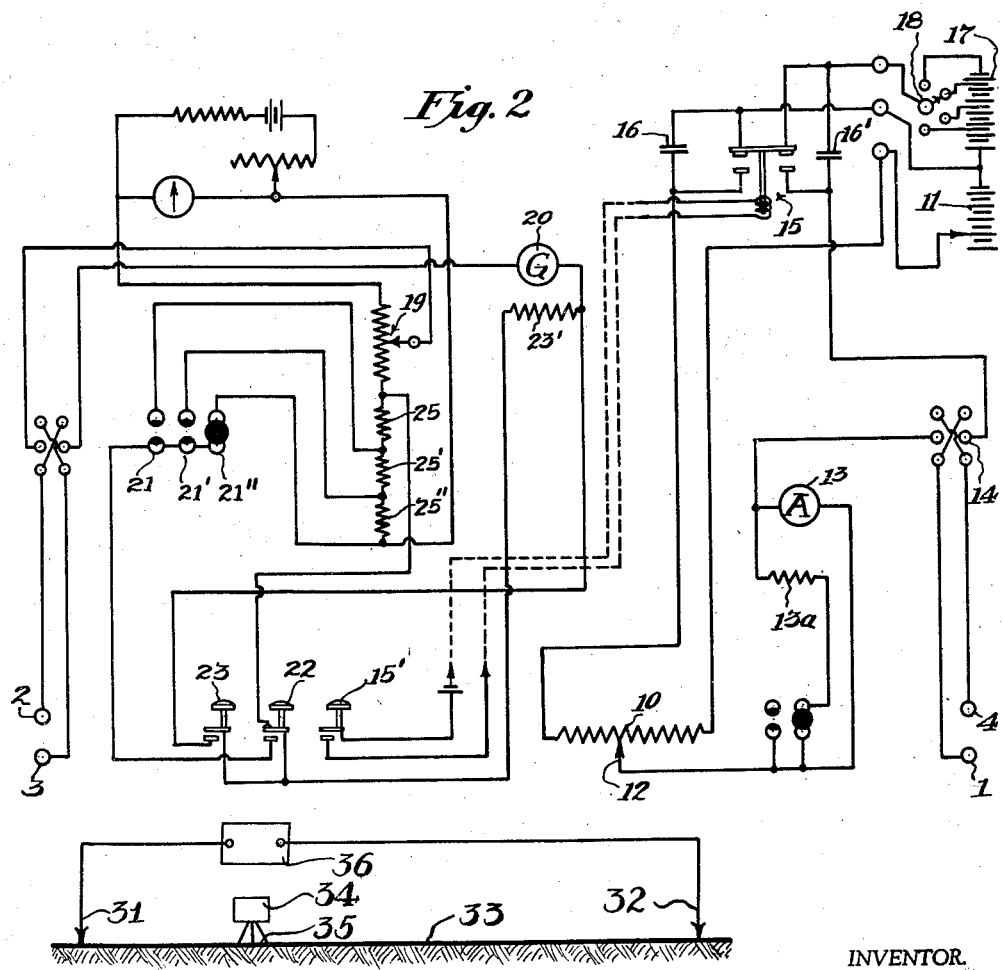
Fig.2.
Fig.6.
INVENTOR.
JOHN JAY JAKOSKY,
BY
ATTORNEYS.

July 22, 1941.  J. J. JAKOSKY  2,250,024

METHOD OF DETERMINING UNDERGROUND STRUCTURES

Filed Dec. 1, 1937  2 Sheets-Sheet 2

INVENTOR.
JOHN JAY JAKOSKY,
BY
ATTORNEYS.

Patented July 22, 1941

2,250,024

UNITED STATES PATENT OFFICE 2,250,024

METHOD OF DETERMINING UNDERGROUND STRUCTURES

John Jay Jakosky, Los Angeles, Calif.

Application December 1, 1937, Serial No. 177,573

19 Claims. (Cl. 175—182)

This invention relates to the study of underground structure by means of electrical observations made at the earth's surface. Particularly it refers to the detection, location and correlation of inhomogeneities in the earth's sub-surface by means of measurements of the earth's electrical conductivity made at the surface of the ground.

More specifically, this invention comprises improvements over the methods at present practiced in measuring the electrical conductivity (or the related quantity, electrical resistance) of materials in place below the earth's surface, and, further, includes improvements in the mode of utilizing the data thus obtained in order to derive information concerning underground structure. By virtue of these improvements the desired information may be more readily and accurately obtained, with a saving in the time required in making measurements in the field and in reaching conclusions as to the existence, location and correlation of sub-surface inhomogeneities.

This application is a continuation-in-part of my copending application Serial No. 12,640, filed March 23, 1935; Serial No. 112,747, filed November 25, 1936, now issued as Patent No. 2,105,247; and Serial No. 144,467, filed May 24, 1937, now Patent No. 2,174,343.

Present methods of using current passed into the ground as a basis for determinations of sub-surface structure express the experimental results in terms of electrical resistivity of the sub-surface materials. The improvements herein described are more directly and conveniently expressed in terms of specific conductance, which is related to specific resistivity by the well known formula $C_c = 1/\rho_c$, where $C_c$ represents specific conductance and $\rho_c$ specific resistivity.

In present methods of measuring the resistivity of earth materials in place, a flow of direct or alternating current is produced in the sub-surface, usually by making connection to the earth's surface at two points, and passing a current through the circuit comprising the two points, the earth and the connectors from said points to the power supply. While current is passing, measurement is made of the potential existing between two auxiliary electrodes having a known spacial relationship with the two current or power electrodes. Knowing (1) the electrode spacing, (2) the current flowing between the two current electrodes, and (3) the potential existing between the two auxiliary or potential electrodes all at some given instant, calculations are made which give resistivity (or conductivity) of the sub-surface materials included by the measurements.

The several figures accompanying this description are as follows:

Fig. 1 is a diagrammatic drawing illustrating a conventional method of making resistivity measurements of earth materials in place, according to common present practice. In some cases this equipment is supplemented by a double-commutator system for synchronously reversing the current and the potential electrodes;

Fig. 2 is a diagrammatic drawing of one form of apparatus for use in the improved method of determining the resistance of earth materials as disclosed in the present application;

Fig. 6 is a diagrammatic side elevation, representative of an apparatus arrangement which may be used according to my invention.

Figure 3:
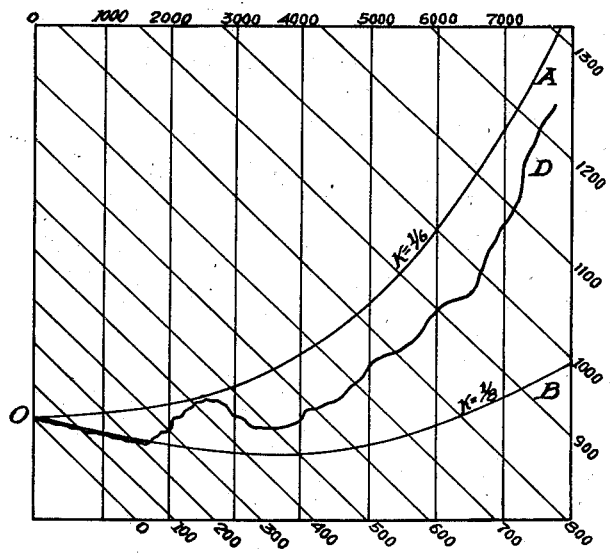
Fig. 3 illustrates a method of plotting results in the field which is feasible with the new type of apparatus herein described and which requires no preliminary calculations.

A more detailed description of a conventional method of making resistivity measurements with direct current follows, with reference to Fig. 1. In the figure, 1 and 4 represent the two current electrodes, 2 and 3 the two potential electrodes. The two potential electrodes may be of the non-polarizing type. It is customary to place the electrodes 1, 2, 3, and 4 in a straight line and, while various spacings may be used, the present description will assume that 1—2, 2—3, and 3—4 are equal distances $a$. A battery for supplying power is shown at 5 with a selector switch at 9 whereby one or more cells or groups of cells may be included in the circuit. A milliammeter is represented at 6 with shunts 7. A switch 7' connected to the shunts of different magnitude allows the meter to cover a wide range of current value. A potentiometer 8 is connected to the two potential electrodes 2 and 3 and permits the potential between 2 and 3 to be determined when zero current passes through the circuit 2—8—3 and the earth between the electrodes.

With the above equal spacing of electrodes the resistivity is found by means of the formula:

$$\rho_c = 2\pi a \frac{E}{I}$$

wherein $\rho_c$ = the resistivity
$a$ = the distance between adjacent electrodes
$E$ = potential in millivolts between the potential electrodes, read on potentiometer 8
$I$ = current in milliamperes between the current electrodes, read on milliammeter 6

If the earth's sub-surface is homogeneous throughout a sufficient distance below and about the area included in the measurements the resistivity or conductivity as calculated by this formula is the true specific resistivity of the homogeneous materials. If, however, inhomogeneities exist, $\rho_c$ as calculated is a weighted average of the specific resistivities of all materials actually traversed by the electric current, between the two equipotential surfaces which are determined by the points of contact of the potential electrodes with the ground. In the following statements the term resistivity will denote the above described weighted average of the true specific resistivities, $\rho_c$.

Having determined $\rho_c$ for a series of increasing spacings $a$ between electrodes, the values of $\rho_c$ are plotted as ordinates against the corresponding values of $a$ as abscissas on coordinate paper. Inhomogeneities in the earth's sub-surface will be evidenced by variations in the values of $\rho_c$, and the deviations from horizontal linearity of the plotted curve are interpretable to give information as to the nature and location of discontinuities in the earth's sub-surface.

In making an observation with the apparatus described, the procedure is as follows: The electrodes and connecting wires having been made ready, switch 9 is set so as to cause a current of convenient magnitude to flow through the ground. Potentiometer 8 is then adjusted until zero current flows through the circuit 2—8—3. The ground current is then read by means of meter 6, the reading of the potentiometer is observed and the observed values of E and I are recorded opposite the corresponding value of $a$. The electrodes are then shifted to new positions, and the observations are repeated, and so on until the series as planned is completed.

In applying this method and other electrical sub-surface investigation methods to deep sub-surface investigations, it has been found that many irregularities occur. Certain of these irregularities are caused by polarization and other phenomena associated with the flow of current. A means of correction for these errors by controlling the time of current flow, is described in my United States Patent No. 2,015,401, issued September 24, 1935. Another error which is of considerable importance in deep investigations requiring great accuracy is caused by the changes in the calculated resistivity at different magnitudes of current flow. I have found that the resistivity of practically all earth materials varies with the current passing between the current electrodes while the measurements are being made. In some cases the resistivity increases with an increase in current, (the electrodes remaining in fixed positions), while in other cases there is a very material decrease in resistance as the current is increased. This phenomenon probably is associated with electrolytic and ionization effects, which in turn depend upon the nature of the electrolyte contained in the earth materials, and the chemical and physical characteristics of the gangue matter comprising the earth materials, and the nature of the electrodes. These variations are of such magnitude as to cause many irregularities in the measurements when made in the conventional manner heretofore employed. No attempt is made in present methods to adjust the flow of current with accuracy or to maintain a definite potential during a series of observations, or to vary either current or potential in a definite or regular manner, the customary procedure being to simply employ a current flow of convenient magnitude for each set of observations, which will give a conveniently measurable potential between the potential electrodes.

My observations, based on extensive field work, have shown that such irregularities may obscure and in some cases entirely conceal effects due to major structural discontinuities in the earth, although the detection, location and correlation of the latter is the sole object of the observations. I have found, moreover, that when a regular predetermined relationship is maintained in the values of either E or I at successive positions of the electrodes, so as to hold either E or I constant or to cause either E or I to be varied in a regular and systematic manner throughout the series, the effect of such irregularities is so greatly minimized as to leave effects due to major structural discontinuities in the earth clearly exposed in the plotted curves.

For practical reasons I prefer in some cases to keep E constant throughout each series. Maintaining a constant value for E, is preferable to keeping I constant because, in the latter case, I must first be adjusted to its desired value and the potentiometer employed for measuring E must then be adjusted. During the latter manipulation I will ordinarily have changed, partly because of polarization of the batteries supplying the current and partly because of changes of resistance or counter E. M. F. produced in the earth path by the current itself. It is therefore difficult to maintain the current constant. For the same reasons it is difficult to vary the current according to any regular procedure which will require a predetermined current to exist at the instant of each observation.

On the other hand, when a constant value for E is to be maintained, or a systematic variation of E with depth is to be used, the potentiometer may be set to any predetermined value and the current then adjusted until the galvanometer included in the potentiometer circuit indicates zero current in the circuit 2—8—3, of Fig. 1. It is then only necessary to read the current I at that instant, and this may readily be done so quickly that the above-mentioned changes in current are negligible while the reading is being made.

If, during a series of observations, it becomes advisable to change from one fixed value of E to another, such change may be made and its effect as a disturbing influence evaluated by taking double readings with both values of E at one or more positions of the electrodes before discontinuing the old value of E and continuing solely with the new value. In this manner the readings taken at different fixed values of E can readily be correlated.

Another advantage of the new procedure herein described results from shortening and rendering more constant the time during which it is necessary for current to flow between electrodes 1 and 4. As described in my Patent No. 2,015,401 referred to above, polarization and other phenomena increase as disturbing influences with the quantity of electricity passed. I have found by field observations with the new type of apparatus described below that it is necessary for current I to be continued no longer than one to two seconds for each observation, and that the time required for observations in the hands of a practiced operator is very nearly constant. This feature eliminates a fruitful source of obscuring irregularities in the results.

Observations at constant E may be made rapidly and accurately by the apparatus represented in Fig. 2, which embodies essential features of this invention. Referring to Fig. 2, a current controlling potentiometer 10 is connected across a battery 11, with a contactor 12, whereby a unidirectional potential, with its resultant unidirectional current flow, may be impressed across the two current electrodes 1 and 4. In this manner any current value within the range of the battery 11 may be obtained merely by varying the position of the contactor 12. An ammeter 13 and a suitable shunt 13a is provided for measuring the flow of current. A reversing switch 14 is connected in the circuit in order that the electrode 1, or 4, may be positive or negative as desired. An electromagnetically operated switch 15, shunted by condensers 16 and 16' is provided for opening and closing the circuit. It will be noted from the wiring diagram that when the potential obtained from battery 11 is insufficient to cause the desired current flow between electrodes 1 and 4, this potential may be augmented by the supplementary battery 17 to which connection is made by the multiple-point switch 18. Switch 18 therefore gives rough adjustments of the current, in steps depending upon the number of batteries connected between each point on the switch, while the potentiometer 10 with its contactor 12 allows very accurate control of the current. It will, of course, be understood that any other form of power supply, capable of accurate control, may be employed. The unidirectional potential existing between the potential electrodes 2 and 3 may be measured by means of the conventional potentiometer 19. In practice of this invention, however, the potentiometer 19, exclusive of the resistances 25, 25', and 25", is employed merely to determine or to neutralize the normal ground potential existing between electrodes 2 and 3, and as a first step in the measurement of earth resistance it is adjusted to give a reading, preferably zero, on the galvanometer 20. By means of a plug switching device 21, 21', and 21", and a push-button switch 22, any desired additional potential may be thrown into the circuit 2—3, by cutting in additional resistances 25, 25', and 25". In practical operation I have found that values of 5, 10, and 20 millivolts are most advantageous for the usual conditions encountered. Push-button 23 is advantageous for cutting out the series resistor 23' when final measurements are being made. The push-button 15' controls the electromagnetically operated current switch 15 in the power circuit.

It is usually desirable to employ non-polarizing electrodes for the potential electrodes.

In making measurements with the apparatus as described, the operator may choose some convenient value for the potential to be created between electrodes 2 and 3, and that potential value may be maintained constant throughout a series of measurements. The magnitude of this potential is selected by plugging in on 21, 21', or 21" so as to impress a fixed potential of this selected value between the potential electrodes. Assuming that the apparatus has been connected to the current and potential electrodes, arranged for example as indicated in Fig. 1, the operator adjusts the neutralizing potentiometer 19 until an approximate balance is indicated by the galvanometer 20. The push-button 23 is then depressed, resulting in greater sensitivity of the galvanometer and the final balance is obtained. Push-button 22 is next depressed, which automatically introduces the desired potential, as determined by the selected resistance of the potentiometer, in the circuit connected to the potential electrodes 2 and 3. Simultaneously with the depressing of push-button 22, the operator depresses the push-button 15', causing current to flow through the earth between the current electrodes 1 and 4 and thus creating between electrodes 2 and 3 a potential opposing the potential impressed by the potentiometer. The switch 18 and the current control contactor 12 are now varied until the galvanometer returns to the null point, indicating that the potential created by the current flow through the earth is equal to the fixed value of potential determined by the potentiometer setting. The current indicated by the ammeter 13 is then read. It is advantageous to maintain the flow of current for a definite period of time, sufficient to create a polarization potential in the earth traversed thereby, before taking the reading, this period of time being usually about one or two seconds. This time interval may usually be controlled by the operator by observation of a split second indicating clock. This procedure is employed throughout a series of measurements, wherein the electrodes are successively moved to different positions. For example, the electrode spacing may be progressively changed, while maintaining fixed spacing ratios between the electrodes 1, 2, 3, and 4, as described above in connection with Fig. 1.

If, instead of keeping E constant throughout a series of measurements, it is desired to vary the value of E in a regular systematic manner, the apparatus shown in Fig. 2 may be used, by simply substituting an adjustable potentiometer for the fixed resistances 25, 25', and 25" and plug switches 21, 21', and 21".

In addition to the simplified operation and increased accuracy of results obtained by use of the improvements described herein, there is a further advantage of great simplification in calculation and plotting. The conventional method, using the formula (1) $$\rho_c = 2\pi a \frac{E}{I} = \frac{1}{C_c}$$

in which $a$, $E$, and $I$ are all variable, requires substitution of the recorded values of $a$, $E$, and $I$ followed by two multiplications and one division in order to evaluate $\rho_c$. In my method, however, where E is constant, $2\pi E$ may be combined into a single constant, (2) $$2\pi E = k$$

and Equation 1 then becomes (3) $$\rho_c = k\frac{a}{I} = \frac{1}{C_c} \text{ or } C_c = \frac{1}{k}\frac{I}{a} = k'\frac{I}{a}$$

Evaluation of $\rho_c$ or $C_c$ then requires but one multiplication and one division.

Further simplification in plotting is possible. Equation 3 shows that, when using the conventional electrode configuration illustrated in Fig. 1, $C_c$ depends upon the two variables $I$ and $a$, the latter of which, in practice, is varied in a known, regular and progressive manner, while the former varies irregularly according to the structure and conductivities of materials in the sub-surface. If the sub-surface were homogeneous, and $C_c$ accordingly were constant, $I$ would vary directly as $a$ and a plot of $I$ against $a$ (in rectangular coordinates) would be a straight line passing through the origin and rising obliquely to the right. Variations in conductivity as $a$ is varied find expression in deviations from linearity when $I$ is plotted against $a$. It is not necessary that values of $C_c$ be actually determined, since the deviations from the norm (a straight line), and the values of $a$ at which they occur, give all the information necessary and usable to interpret the sub-surface structure. According to this invention, therefore, it is only necessary to plot $I$ against $a$, an operation which is readily conducted in the field as the successive determinations of $I$ are made.

Certain specially ruled types of coordinate paper have proved convenient and valuable in interpretation. One such type is shown in Fig. 3. In this paper ordinates are measured in a vertical direction according to the customary procedure, but the axis of ordinates, instead of being horizontal, is inclined downward to the right. The effect is to reduce the slope of the norms (lines of constant conductivity). Deviations from the norms are more readily seen, and inter-comparisons between curves on different sheets are more easily made, when the curves are approximately horizontal on the page, and this results from the oblique ruling shown in Fig. 3.

The ruling of Fig. 3 further departs from conventional rulings in another respect, that is, the spacing between the oblique ordinate rulings increases as their distance from the base line increases. This increase in spacing may be made according to logarithmic, harmonic, exponential, or other law as deemed convenient. The reason for the expanding scale is that $I$ tends to show greater absolute values and smaller fluctuations in value as $a$ is increased, and a gradual magnification of these smaller fluctuations assists in revealing significant changes in conductivity. With the expanding scale of ordinates, however, the norms (lines of constant conductivity) are no longer straight lines. Two such norms, representing two values of conductivity, are shown in Fig. 3 in curves OA and OB. These two curves have values of ⅙ and ⅛ respectively, for $k'$ in Equation 3. Deviations from the type of curve shown and the values of $a$ at which the deviations occur are the significant elements in interpretation of curves plotted on this type of paper. To illustrate the character of deviations from the norm, a set of actual field data have been plotted in Fig. 3 as curve OD.

By replacing the fixed potential drops 25, 25′, and 25″ by a variable potentiometer as disclosed above, E may be varied progressively throughout a series of readings over various values of electrode spacing $a$, according to any predetermined method, and the values of $I$ may be measured in the same manner as before. Specifically, E may be advantageously varied in inverse proportion to $a$ so that the product $E a$ is constant. Equation 1 then reduces to the form $$\rho_c = \frac{k''}{I}$$

and Equation 4 to the form $$C_c = k''' I$$

If $I$ is now plotted against $a$, the resulting curve will directly represent the variations of $C_c$ at different depths corresponding to the respective values of $a$, and will be of essentially the same form as curve OD of Fig. 3.

The above described modified form of apparatus with an adjustable potentiometer in place of the fixed potential drops, 25, 25′, and 25″ in Fig. 2, may also be used to take measurements of E, while keeping $I$ constant or varying the latter in a regular systematic manner at different values of $a$, the desired values of $I$ being maintained by adjustment of the potentiometer 10 and switch 18 in the current circuit until the ammeter 13 gives the desired reading. In this case, the measured values of E may be plotted against $a$, in order to obtain curves of corresponding significance to the above-mentioned curve OD. In some cases it is advantageous to vary $I$ in direct proportion to $a$, so that the values of E as measured at the different electrode spacings will be directly proportional to the corresponding values of $\rho_c$. If E is then plotted against $a$, the resulting curve will correctly reflect variations in $\rho_c$.

While I have described my invention particularly in connection with a conventional electrical surveying procedure in which the potential electrodes are located between the current electrodes, and in which the spacing of the electrodes is progressively varied while keeping a constant ratio between the electrode separations, it will be understood that the advantages herein described as obtained by maintaining a regular systematic relationship in the values of either the energizing current or the created potential may be realized, in general, in any electrical survey procedure in which successive measurements are taken with either one or both of the current electrodes disposed successively in different positions.

For example, the potential electrodes need not be symmetrically disposed between the current electrodes, and it is not essential that the ratio between the current electrode spacing and the potential electrode spacing be kept constant at different positions of the current electrodes. The potential electrodes may both be located adjacent one of the current electrodes, or if desired, two pairs of potential electrodes may be used, one pair being located adjacent each of the current electrodes. The potential electrodes may be located outwardly of the current electrodes, instead of therebetween, or may be located at positions laterally removed from a line extending through the two current electrodes.

According to certain procedures, the potential electrodes may be kept in a fixed position, either intermediate the two current electrodes or adjacent one or both of the current electrodes, as measurements are taken with either one or both of the current electrodes in different positions, or the entire electrode configuration may be moved over the surface of the earth, with either constant or varying spacings between the current electrodes and between the potential electrodes.

The practice of the present invention in connection with various other procedures such as outlined above is more fully described in my copending applications Ser. Nos. 144,467, 145,795, 162,635, 172,009, and 112,747 (Patent No. 2,105,-247), filed May 24, 1937; June 1, 1937; September 7, 1937; October 30, 1937, and November 25, 1936, respectively; regardless of the electrode arrangement employed, the characteristic feature of this aspect of the present invention is that a regular systematic relationship is maintained in the values of one of the quantities—the current passed through the earth and the potential created between the potential electrodes—and a series of measurements of the other of said quantities is taken, as the position of at least one of the current electrodes is varied so as to vary the path of current flow through the earth. As pointed out above, this regular systematic relationship may be maintained either by keeping the one quantity—potential or current—constant throughout the series of measurements of the other quantity, or by regularly varying the one quantity while taking the series of measurements of the other quantity, as for example, by regularly varying the current in proportion to the spacing between the current electrodes, or in proportion to some power or other function of such spacing, as such spacing is varied by moving one or both of the current electrodes, in order to maintain a substantially constant density of current flow per unit cross-section in that portion of the earth between which the created potential is utilized. It will be obvious that the electric circuit arrangement illustrated in Fig. 2 may be used to advantage in any of the above-described embodiments of this invention.

The method of this invention is not limited to measurements involving the value of the potential created between pairs of spaced points on the earth's surface, but may be used when other created quantities are utilized in the measurement. In general, the created quantity which is utilized in obtaining a series of measurements according to this invention may be any quantity whose value is dependent upon the path of current flow and upon the characteristics of the materials traversed by the current. For example, instead of a potential between two points on the earth's surface, the created quantity may be a magnetic or electromagnetic field.

It will be seen from the above description that this invention provides, in general, for passing current through the earth between two spaced electrodes so as to create some other quantity, such as a potential difference or a magnetic field, at some position of known spacial relationship with respect to said electrodes, and repeating this procedure with at least one of the current electrodes disposed successively at different positions, while maintaining a regular predetermined relationship in the value of one of the two quantities—the current and the created quantity—at the different positions of said one electrode, and measuring a quantity which is dependent upon the value of the other of said two quantities. The quantity measured may be either the current itself, or it may be the created quantity itself—as in the case of actual measurement of a created potential or a created magnetic field—, or it may be some other quantity, such as the ratio of the potential or magnetic field to the current, as described particularly in my above-mentioned patent application Serial No. 162,635, and in my pending application Serial No. 146,781, filed June 7, 1937, now Patents 2,207,060 and 2,137,650 respectively, or an electrical current induced in a suitable pick-up device by the created magnetic field.

Referring to Fig. 6, I have illustrated an apparatus in which measurements involving created magnetic or electromagnetic fields may be taken. Current electrodes 31 and 32 are shown connected to the earth indicated at 33 and spaced from one another along the surface of the earth. Between the two current electrodes I have shown a measuring instrument 34 located at a position 35 on the earth's surface having a known spacial relationship with respect to the current electrodes. Electrodes 31 and 32 are connected to a source of current 36 which is provided with suitable means of control and for indicating the magnitude of current passing through the earth between the current electrodes 31 and 32. The instrument 34 may be of any of the types described in my issued Patents Nos. 1,906,271 and 2,015,401, for measuring the magnetic or electromagnetic field at the position of said instrument created by the flow of current between electrodes 31 and 32, either by direct magnetic measurement or by measurement of an electric current induced in a coil and whose value is dependent upon the strength of a magnetic field. The choice of instrument will depend upon whether the current from the source 36 is direct, alternating, or pulsating, and suitable instruments are described in said patents for use with any of said types of current.

As in the case of measurements involving potential described above, the relative values of the energizing current and the created magnetic or electromagnetic field will depend upon the nature and characteristics of the subsurface traversed by the current and the measurements are taken of one of said quantities while the other is maintained constant or is varied in a regular and predetermined manner for each position of one or both of the current electrodes. For example, the value of the created magnetic field as measured by the instrument 34 at the position 35 may be maintained constant and the current passed through the earth between the electrodes 31 and 32 may be adjusted to give this constant value of the created magnetic field for the different paths of current flow through the earth between the electrodes 31 and 32 as either one or both of the electrodes is moved to different positions on the earth's surface, and the current may be measured; or, for example, the value of the created magnetic field may be varied in accordance with some function of the spacing between the electrodes 31 and 32 and the current required to give this value of magnetic field may be measured for each separation of the electrodes 31 and 32 as either one or both of the electrodes is moved to different positions on the earth's surface.

As another example, the current passed through the earth between the current electrodes 31 and 32 may be maintained constant for all the positions of the current electrodes or it may be varied in accordance with some power or other function of the spacing between the current electrodes and measurements of the created magnetic or electromagnetic field may be taken at the instrument 36.

The position 35 occupied by the instrument 34 may remain fixed on the earth's surface as either one or both of the electrodes 31 and 32 is moved to different positions on the earth's surface, or the position 35 may bear a fixed or variable relation with respect to either one or both of the electrodes 31 or 32. For example, the position 35 may be maintained at a fixed distance from the electrode 31 or it may be maintained at a position to give a constant ratio of its distances from the electrodes 31 and 32, respectively.

It will now be apparent that instruments of the type designated at 34 may be located at one or more positions about the current electrode 31, for example, or at positions such as defined by the potential electrodes 2 and 3 in Fig. 1, and that the measurements involving the created magnetic quantity may be treated in a manner comparable to the potential measurements described herein, whereby the resistivity, for example, of the subsurface may be determined from the measurements so obtained. The magnetic surveying system disclosed herein is disclosed and specifically claimed in my copending application, Ser. No. 396,311, filed June 2, 1941.

With the methods of rapid instrumental reading and plotting disclosed herein, it is practicable to obtain more complete data than has hitherto been possible. The quantity of field data at present obtainable within an allotted time for a given survey is definitely limited by the time necessarily consumed in instrument readings and set aside for calculation and plotting of results. For accurate work it is essential that current be passed through the ground in more than one azimuthal direction in order to eliminate the effects introduced by uneven topography and by strike and dip of the beds. In order to evaluate such effects when using conventional methods, it is necessary to run two or three depth-resistivity sections at each station, preferably at 90° or 120° azimuthal separation respectively, which nearly doubles or trebles the time devoted to each station, or divides the number of stations which can be run in a given time by nearly two or three. For economic reasons the time devoted to each survey is usually prescribed, and in practice single sections are customarily run at each station with resulting inaccuracies, or even major errors, in the final interpretation of results.

Figures 4, 5:
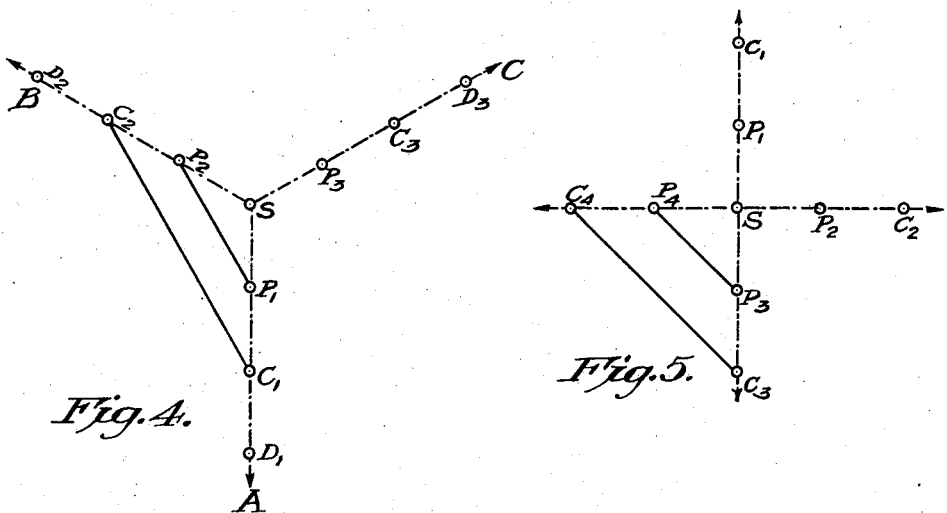
Fig. 4 illustrates a method of laying out the lines of survey at an electrical survey station by which three separate conductivity readings may be taken at each setting of electrodes, using the improved apparatus disclosed herein, with a resulting improvement in accuracy and certainty of interpretation over methods at present in use.
Fig. 5 illustrates a similar method of laying out the lines of survey by which six separate readings of conductivity may be taken at each setting of the electrodes.

By a method which I have evolved, multiple sections can be obtained at each station in no longer time than at present required for single stations. The preferred field procedure consists in laying out at a given station S three radiating lines at angles 120° as shown in Fig. 4. Beginning at the point S a selected distance is repeatedly measured off along each line, as for instance the distances $SP_1$, $P_1C_1$, $C_1D_1$, etc., as many times as desired along line A; the same repeated distance $SP_2$, $P_2C_2$, $C_2D_2$, etc., along line B; and similarly along line C. Current electrodes are placed in the ground at three points equidistant from S on the three lines, as at $C_1$, $C_2$, and $C_3$, and are connected with a switch-board located at the instrument so that any two electrodes may be connected to the power supply and the current measuring instrument. Similarly, three potential electrodes are placed equidistantly from S on the three lines, as at $P_1$, $P_2$, and $P_3$, and connected through a similar instrument switch to the constant potential apparatus. The three potential electrodes may be nearer to or farther from S than the current electrodes. Operators are stationed at the six electrodes to extend the wires and move the electrodes to new points as each set of readings is completed. A set of readings consists, for example, in measuring and plotting current passed into the ground between $C_1$ and $C_2$ while a definite potential exists between $P_1$ and $P_2$ according to the method described above; switching to electrodes $C_2$, $C_3$, $P_2$, and $P_3$ and similarly measuring and plotting current; and finally switching to electrodes $C_3$, $C_1$, $P_3$, and $P_1$ and again similarly measuring and plotting current, the current flow being in each case preferably adjusted to give the same potential between the two potential electrodes. In this way three complete measurements at different azimuths are made for each electrode spacing as measured from the point S. When measurements are made in this manner irregularities in the plotted curves due to rough topography or to dip of stratified layers may be detected by comparison of the three plots, and may be eliminated in interpretation of the results. It is important to note that the measurements are made around the station S, and at a distance therefrom which increases with the electrode separation. This particular distribution of current and potential results in greater accuracy than can be obtained either by using a single electrode at S and plotting equipotential lines about that point, or by plotting numerous resistivity sections passing through the point S.

An alternative arrangement which allows greater detail and which also gives the desired distribution of current lines about and equidistant from point S is illustrated in Fig. 5. This arrangement consists in running four lines 90° apart from the point S, and marking out equidistant stations along these lines. The four current electrodes $C_1$, $C_2$, $C_3$, and $C_4$ taken two at a time allow six combinations, to each of which corresponds a similar pair of potential electrodes whose positions are indicated at $P_1$, $P_2$, $P_3$, and $P_4$. Six separate plotted curves may therefore be made for each station, greatly increasing the accuracy of interpretation.

It will be understood that, when using either of the multiple section methods illustrated in Figs. 4 and 5, a series of measurements is made with various electrode spacings along the several traverse lines radiating from the common point S, and that the relative spacings of the several current and potential electrodes from point S may, if desired, be maintained uniform for all these measurements. Also, it will be understood that E may either be maintained constant throughout all these measurements, or the same may be varied in a systematic manner at the different electrode spacings, while measuring the value of I, or I may be maintained constant or may be varied in a systematic manner at the different electrode spacings, while measuring the values of E. The measurements thus obtained may, as before, be interpreted to give the desired information, either by calculation of $\rho_c$ or $C_c$, by suitable equations, or by plotting the measured value of I or E against $a$, the curves thus obtained having substantially the same significance as the curves obtained in the previously described cases in which all the electrodes were placed along a single straight line. In this connection it is important to note that the interpretation of such curves is in any case primarily dependent upon the comparative shape of the curves obtained from several series of measurements, and upon the relative position of the significant changes in slope of these curves.

The presence of four electrodes besides the two current electrodes in use at any instant, as shown in Fig. 4, all electrodes being connected by wires to the instrument, makes it possible, by retaining one of the four as a fixed potential electrode and successively connecting each of the remaining three as the second potential electrode, to determine relative potentials at four points for each setting of current electrodes. The additional information as to distribution of potential at the surface is of value in correcting final data for topography and dip of strata. An additional electrode at the center S makes another potential reading possible, and this electrode needs no moving throughout the series of observations. Still more complete mapping of the potential field at the surface is accomplished by the electrode arrangement represented in Fig. 5, following the general procedure just described.

The procedures described in relation to Figs. 4 and 5 are disclosed and specifically claimed in my copending application Serial No. 175,666, filed November 20, 1937, now Patent No. 2,138,818.

Although I have described apparatus which is primarily adapted for use with direct currents, the method of this invention may be practiced while using any type of energizing current, such as, for example, commutated direct current, direct or alternating current impulses, alternating current, or a periodically varying unidirectional current. It will be appreciated that the potential or magnetic apparatus will be modified in accordance with the type of energizing current employed, as will be apparent to those skilled in the art.

I claim:

1. A method of electrical exploration of the subsurface, which comprises: establishing a predetermined potential through the earth between a pair of spaced potential electrodes by passing current through the earth between a pair of spaced current electrodes having a known spacial relationship with respect to said potential electrodes and spaced therefrom; repeating this operation with at least one of the current electrodes disposed successively in different positions so as to cause the current to flow through the earth successively in different paths, while controlling the current so as to maintain a regular predetermined relationship in the values of said potential for the different paths of current flow; and measuring the current passed between said current electrodes through each of a plurality of said different current paths.

2. A method of electrical exploration of the subsurface, which comprises: establishing a predetermined potential through the earth between a pair of spaced potential electrodes by passing current through the earth between a pair of spaced current electrodes having a known spacial relationship with respect to said potential electrodes and spaced therefrom; repeating this operation with regularly varying spacings between the electrodes of each pair but with the same relative arrangement of the two pairs of electrodes with respect to one another, while maintaining a regular predetermined relationship in the values of said potential at the different electrode spacings; and measuring the current passed between said current electrodes at each electrode spacing.

3. A method of electrical exploration of the subsurface, which comprises: establishing a predetermined potential through the earth between a pair of spaced potential electrodes by passing current through the earth between a pair of spaced current electrodes having a known spacial relationship with respect to said potential electrodes and spaced therefrom; repeating this operation with at least one of the current electrodes disposed successively in different positions so as to cause the current to flow through the earth successively in different paths, while controlling the current so as to maintain the predetermined potential at a constant value for the different paths of current flow; and measuring the current passed between said current electrodes through each of a plurality of said different current paths.

4. A method of electrical exploration of the subsurface, which comprises: establishing a predetermined potential through the earth between a pair of spaced potential electrodes by passing current through the earth between a pair of spaced current electrodes having a known spacial relationship with respect to said potential electrodes and spaced therefrom; repeating this operation with regularly varying spacings between the electrodes of each pair but with the same relative arrangement of the two pairs of electrodes with respect to one another, while maintaining the predetermined potential at a contant value at the different electrode spacings; and measuring the current passed between said current electrodes at each electrode spacing.

5. A method of electrical exploration of the subsurface, which comprises: establishing a predetermined potential through the earth between a pair of spaced potential electrodes by passing current through the earth between a pair of spaced current electrodes having a known spacial relationship with respect to said potential electrodes and spaced therefrom; repeating this operation with regularly varying spacings between the electrodes of each pair but with the same relative arrangement of the two pairs of electrodes with respect to one another, while varying the predetermined potential maintained at the different electrode spacings in a regular systematic manner; and measuring the current passed between said current electrodes at each electrode spacing.

6. A method of electrical exploration of the subsurface, which comprises: establishing a predetermined potential through the earth between a pair of spaced potential electrodes by passing current through the earth between a pair of spaced current electrodes having a known spacial relationship with respect to said potential electrodes and spaced therefrom; repeating this operation with regularly varying spacings between the electrodes of each pair but with the same relative arrangement of the two pairs of electrodes with respect to one another, while varying the predetermined potential maintained at the different electrode spacings in inverse proportion to the spacing between the potential electrodes; and measuring the current passed between said current electrodes at each electrode spacing.

7. A method of electrical exploration of the subsurface, which comprises: establishing a potential through the earth between a pair of spaced potential electrodes by passing current through the earth between a pair of spaced current electrodes having a known spacial relationship with respect to said potential electrodes and spaced therefrom; repeating this operation with regularly varying spacings between the electrodes of each pair but with the same relative arrangement of the two pairs of electrodes with respect to one another, while maintaining a regular systematic relationship in the current passed through the earth at the different electrode spacings; and measuring the potential between said potential electrodes at each electrode spacing.

8. A method of electrical exploration of the subsurface, which comprises: establishing a potential through the earth between a pair of spaced potential electrodes by passing current through the earth between a pair of spaced current electrodes having a known spacial relationship with respect to said potential electrodes and spaced therefrom; repeating this operation with at least one of the current electrodes disposed successively in different positions so as to regularly vary the spacing between the current electrodes, while varying the current passed between the current electrodes for the different spacings of said current electrodes in a regular systematic manner; and measuring the potential between said potential electrodes for each spacing of said current electrodes.

9. A method of electrical exploration of the subsurface, which comprises: establishing a potential through the earth between a pair of spaced potential electrodes by passing current through the earth between a pair of spaced current electrodes having a known spacial relationship with respect to said potential electrodes and spaced therefrom; repeating this operation with regularly varying spacings between the electrodes of each pair but with the same relative arrangement of the two pairs of electrodes with respect to one another, while varying the current passed between the current electrodes at the different electrode spacings in a regular systematic manner; and measuring the potential between said potential electrodes at each electrode spacing.

10. A method of electrical exploration of the subsurface, which comprises: establishing a potential through the earth between a pair of spaced potential electrodes by passing current through the earth between a pair of spaced current electrodes having a known spacial relationship with respect to said potential electrodes and spaced therefrom; and repeating this operation with at least one of the current electrodes disposed successively in different positions so as to vary the spacing between the two current electrodes, while varying the current passed between said current electrodes in direct proportion to the spacing between the current electrodes.

11. A method of electrical exploration of the subsurface, which comprises: establishing a potential through the earth between a pair of spaced potential electrodes by passing current through the earth between a pair of spaced current electrodes having a known spacial relationship with respect to said potential electrodes and spaced therefrom; and repeating this operation with regularly varying spacings between the electrodes of each pair but with the same relative arrangement of the two pairs of electrodes with respect to one another, while varying the current passed between said current electrodes at the different electrode spacings in direct proportion to the spacing between the current electrodes at each electrode spacing.

12. A method of electrical exploration of the subsurface, which comprises: establishing a unidirectional potential through the earth between a pair of spaced potential electrodes by passing a unidirectional current through the earth between a pair of spaced current electrodes having a known spacial relationship with respect to said potential electrodes and spaced therefrom, said potential and said current constituting two quantities whose relative values are dependent upon the electrical characteristics of the earth traversed by said current; continuing the passage of said current for a definite period of time sufficient to create a polarization potential in the earth traversed thereby; adjusting said current to provide a predetermined value of one of said quantities, and measuring the other of said quantities, at the end of said definite period of time; and repeating these operations with at least one of said current electrodes disposed successively in different positions so as to cause the current to flow through the earth successively in different paths, to obtain a series of successive measurements of said other quantity for the different paths of current flow, while maintaining a definite regular relationship between the predetermined values of said one quantity for the different paths of current flow, said definite period of time being maintained substantially constant throughout said series of successive measurements.

13. A method of electrical exploration of the subsurface, which comprises: establishing a unidirectional potential through the earth between a pair of spaced potential electrodes by passing a unidirectional current through the earth between a pair of spaced current electrodes having a known spacial relationship with respect to said potential electrodes and spaced therefrom, said potential and said current constituting two quantities whose relative values are dependent upon the electrical characteristics of the earth traversed by said current; continuing the passage of said current for a definite period of time sufficient to create a polarization potential in the earth traversed thereby; adjusting said current to provide a predetermined value of one of said quantities, and measuring the other of said quantities, at the end of said definite period of time; and repeating these operations with regularly varying spacings between the electrodes of each pair but with the same relative disposition of the two pairs of electrodes with respect to one another, to obtain a series of successive measurements of said other quantity, while maintaining a definite regular relationship between the predetermined values of said one quantity for the different electrode spacings, said definite period of time being maintained substantially constant throughout said series of successive measurements.

14. In a method of electrical exploration of the subsurface, the steps which comprise: laying out a plurality of spaced points along more than two angularly spaced lines radiating from a common point; placing grounded potential electrodes at points on each of said lines equidistant from said common point; placing grounded current electrodes at points on each of said lines equidistant from said common point but spaced from the locations of the potential electrodes; passing current through the earth between one pair of said current electrodes to produce a predetermined potential difference between the corresponding pair of said potential electrodes, and determining the value of current required to produce said potential; and subsequently passing current through the earth between a different pair of said current electrodes having one electrode in common to the first-named pair, and controlling said current to produce a predetermined potential difference between the corresponding different pair of potential electrodes, and again determining the value of said current required to produce said predetermined potential difference.

15. A method of electrical exploration of the subsurface, which comprises: passing an electric current through the earth between a pair of spaced current electrodes to create, at a position on the earth's surface having a known spacial relationship with respect to said current electrodes and spaced therefrom, another quantity dependent upon the path of flow of said current and the electrical characteristics of the earth traversed by the current; repeating this operation with at least one of said current electrodes disposed successively in different positions so as to cause the current to flow through the earth successively in different paths, while controlling the current so as to maintain a regular predetermined relationship in the values of said created quantity for the different paths of flow of said current; and measuring the current passed between said current electrodes through each of a plurality of said different current paths.

16. A method as set forth in claim 15, in which the value of said created quantity is maintained constant for the different paths of flow of said current.

17. A method of electrical exploration of the subsurface, which comprises: passing an electric current through the earth between a pair of spaced current electrodes to create, at a position on the earth's surface having a known spacial relationship with respect to said current electrodes and spaced therefrom, a predetermined value of another quantity dependent upon the path of flow of said current and the electrical characteristics of the earth traversed by said current; repeating this operation with at least one of said current electrodes disposed successively in different positions so as to regularly vary the spacing between said current electrodes and cause the current to flow through the earth in successively different paths, while controlling the current so as to vary the value of the created quantity in a regular and predetermined manner and maintain a regular predetermined relationship between the values of said quantity and the spacing between said current electrodes; and measuring the current passed between said current electrodes for each value of spacing of said current electrodes.

18. A method of electrical exploration of the subsurface, which comprises: passing an electric current through the earth between a pair of spaced current electrodes to create, at a position on the earth's surface having a known spacial relationship with respect to said current electrodes and spaced therefrom, another quantity dependent upon the path of flow of said current and the electrical characteristics of the earth traversed by said current; repeating this operation with at least one of said current electrodes disposed successively in different positions so as to regularly vary the spacing between said current electrodes and cause the current to flow through the earth in successively different paths, while varying the current passed between said current electrodes for the different positions of said one current electrode in a regular systematic manner; and measuring a quantity dependent upon the value of said created quantity for each value of spacing of said current electrodes.

19. A method of electrical exploration of the subsurface, which comprises: passing an electric current through the earth between a pair of spaced current electrodes to create, at a position on the earth's surface having a known spacial relationship with respect to said current electrodes and spaced therefrom, another quantity dependent upon the path of flow of said current and the electrical characteristics of the earth traversed by said current; repeating this operation with at least one of said current electrodes disposed successively in different positions so as to regularly vary the spacing between said current electrodes and cause the current to flow through the earth in successively different paths, while varying the current passed between said current electrodes for the different positions of said one current electrode in accordance with a function of the spacing between said current electrodes; and measuring a quantity dependent upon the value of said created quantity for each value of spacing of said current electrodes.

JOHN JAY JAKOSKY.